Figure 1:
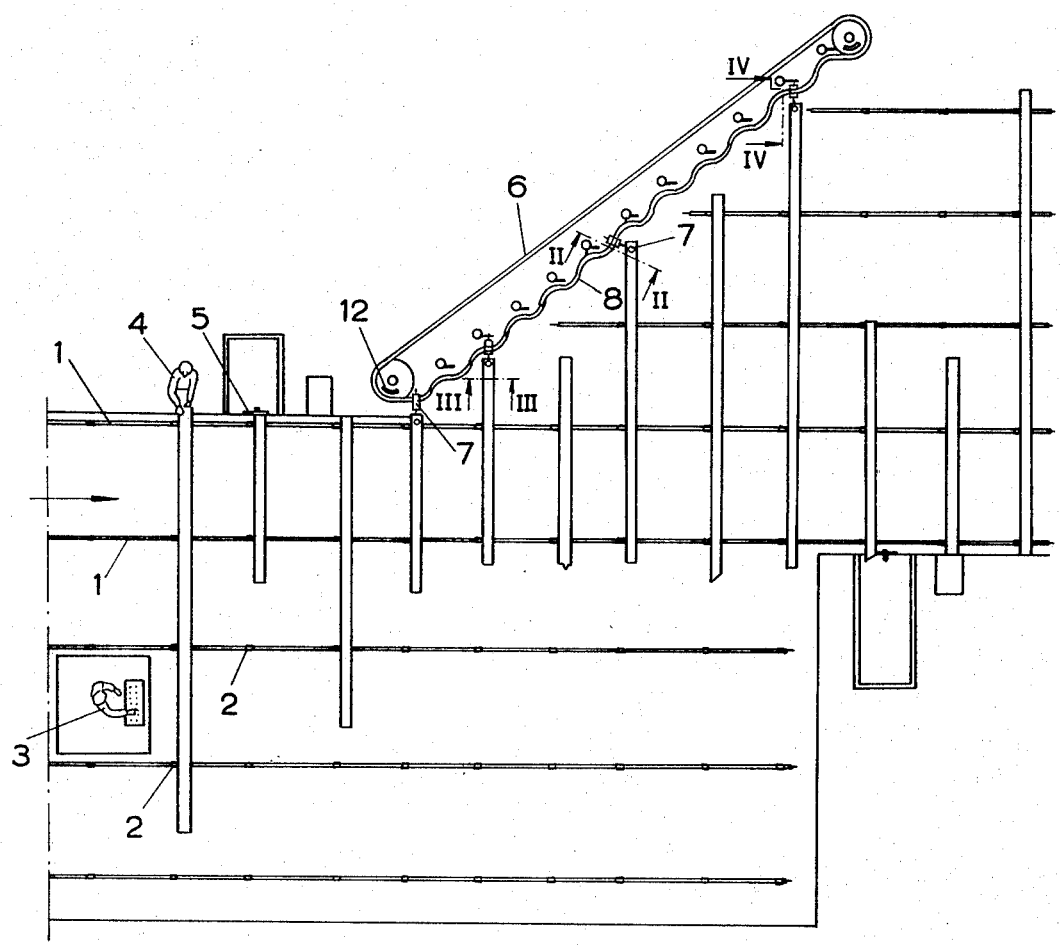

United States Patent [19]
Rysti

[11] 3,720,300
[45] March 13, 1973

[54] TIMBER CONVEYOR

[76] Inventor: Alpo Rysti, Frisansintie 22, Frisans, Finland

[22] Filed: Dec. 15, 1970

[21] Appl. No.: 98,322

[52] U.S. Cl. .................198/20 R, 198/179, 198/29
[51] Int. Cl. ..............................................B65g 47/64
[58] Field of Search .....198/29, 20, 31, 33 R, 33 AA, 198/33 AB, 75, 89, 179, 185; 143/49, 92, 93

[56] References Cited

UNITED STATES PATENTS

| | | | |
|---|---|---|---|
| 3,033,341 | 5/1962 | Cromeens | 198/20 R |
| 3,204,756 | 9/1965 | Lesch | 198/179 |
| 2,920,737 | 1/1960 | Engleson et al. | 198/29 |
| 2,912,093 | 11/1959 | Lauck | 198/32 |

Primary Examiner—Evon C. Blunk
Assistant Examiner—Johnny D. Cherry
Attorney—Richards & Geier

[57] ABSTRACT

Timber conveyor, comprising a conveyor which moves the timber forward in a transverse position and in its continuation an oblique conveyor, on which the timber has both a velocity component in the original transporting direction and a velocity component parallel to the longitudinal direction of each piece of timber. The invention is particularly characterized in that the oblique conveyor has been provided with elements acting upon the ends of the pieces of timber, which elements in the oblique conveyor travel along a curved path so that at the moment when the piece of timber is released the piece of timber has a non-existent or at least nearly non-existent velocity component in its longitudinal direction.

2 Claims, 4 Drawing Figures

TIMBER CONVEYOR

The present invention concerns a timber conveyor, comprising a conveyor transporting the timber onward in transversal position, and on its continuation an oblique conveyor, on which the timber has both a velocity component in the original direction of transport and also a velocity component in the longitudinal direction of each piece of timber.

Conveyors of this kind are used in particularly great number e.g. in the sorting of sawn timber and in its cross-cutting operation to given lengths most nearly corresponding to the original lengths of the pieces. Such conveyors are also employed for handling stocks. The greatest detrimental factor in previously known devices of this kind has been their functional slowness, as a result of which the timber-handling capacity has remained low. The low handling capacity has most of all, in these conveyors, been influenced by the design of the oblique conveyor employed because it has not been possible to increase its speed far enough. Even at the transfer speeds of the oblique conveyor which are used nowadays, one is often compelled e.g. in the assembling of sawn timber packages to be content with a compromise, which means that it is accepted that in the sawn timber package the ends of the sawn timber pieces are not aligned, which is caused by the fact that when a given piece of sawn timber is detached from the oblique conveyor and transferred to be transported by the second conveyor section proper, it still has a smaller or larger velocity component in its longitudinal direction.

The aim of the invention was, in the first place, to increase the handling capacity of timber conveyors of the kind described by changing the design of the oblique conveyor to be such that it no longer constitutes a bottle-neck which would present an obstacle to raising the handling speed of the other parts of the conveyor.

The invention is mainly characterized in that the oblique conveyor has been provided with elements acting upon the end of the pieces of timber, which elements on the oblique conveyor travel along a curved path so that at the moment when any given piece of timber is released it has a non-existent or at least nearly non-existent velocity component in its longitudinal direction.

The invention is described in greater detail in the following, with reference to the accompanying schematic drawing and to one embodiment example of a conveyor according to the invention, shown in this drawing.

FIG. 1 presents the sawn timber conveyor schematically and as viewed from above.

Figure 2:
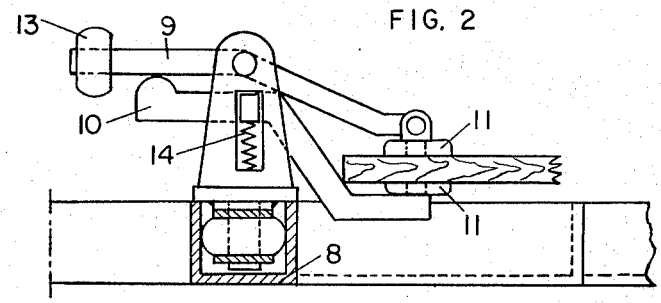

FIG. 2 shows a section along the line II—II in FIG. 1, and

Figure 3:
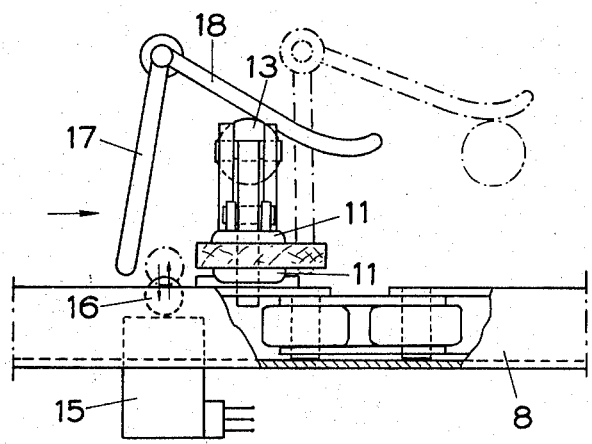
Figure 4:
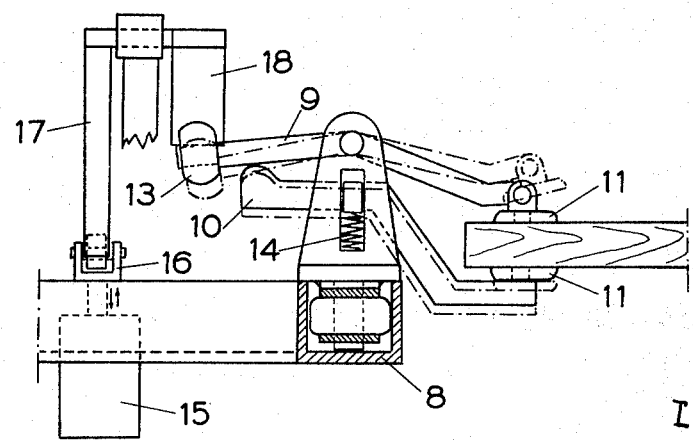

FIGS. 3 and 4 correspondingly show enlarged, more detailed sections taken along the lines III—III and IV—IV in FIG. 1.

In the embodiment displayed in the drawing, the conveyor comprises a conveyor made of chains 1, which has been provided with engagement dogs 2, which move the timber forward in the direction indicated by an arrow in FIG. 1. The sorting work is done by persons 3 and 4, who determine the quality of the piece of timber and the point or points at which it has to be cross-cut. The person 4 determines the cutting point of one end by moving each piece of sawn timber into a position in which the cross-cut saw 5 will remove from its end the unacceptable, e.g. rough-edged, portion. The person 3, again, gives for each piece of timber, with the aid of a register device, a pulse specifying its quality and length, this pulse to travel along with the piece of timber throughout the period of its stay on the conveyor. As register devices, one may use e.g. electro-mechanical selector devices or computer units previously known in themselves, which operate in synchronism with the engagement dogs 2.

After the cut-off saw 5 has cut off the end of the piece of sawn timber, there usually follows marking of the piece. Next, the piece of sawn timber comes into contact with the oblique conveyor 6, the grabbing elements on this conveyor, which have been generally denoted with the reference numeral 7, engaging with the end of the piece of timber. The movement of the conveyor 6 has been synchronized with both parts of the principal conveyor 1, so that the piece of timber always remains between two consecutive engagement dogs 2. The grabbing elements 7 move on the conveyor 6 in the manner shown in FIG. 1 along a curved path so that the piece of sawn timber has a velocity component parallel to its longitudinal direction which varies in its magnitude above the value zero. Those points of the oblique conveyor at which the longitudinal velocity component of the piece of sawn timber is non-existent are intended to coincide with those times at which the piece of timber will be set free from the grip of the elements 7, and the piece therefore continues its travel, carried onward by the second part of the principal conveyor. As a result of the specific shape of the path of conveyor 6, the piece of sawn timber has then, already, a velocity component consistent with the direction of travel of the principal conveyor.

In FIGS. 2 to 4 an embodiment example has been shown, illustrating the kinds of grabbing elements that can be used in connection of the oblique conveyor 6. Here, the grabbing elements consist of pincer-like devices, comprising a lever 9 operating as upper jaw and a lever 10 operating as lower jaw. These have at their ends gripping bodies 11, which are free to turn about their attachment pin so that no torque is imposed on the piece of timber clamped between them when the pincer-like device travels along its tortuous path in the conveyor 6. The conveyor 6 comprises a roller chain moving along a channel formed by a U section steel 8, and the said pincer-like devices have been attached to this roller chain, their lower jaw 10 having been made elastic in the manner seen in FIG. 4, by means of a compression spring 14, so that the distance between the grabbing elements 11 may easily adapt itself to the thickness of the sawn timber pieces to be handled.

The end of the lever 9 has been provided with a roll 13, which in cooperation with a guide 12 of the kind seen in FIG. 1 locks the pincer-like device so that the piece of sawn timber is impacted between the gripping bodies 11 at the initial end of the oblique conveyor 6.

FIGS. 3 and 4 illustrate more closely the manner in which the piece of sawn timber is released from the like device. When the piece of sawn timber has arrived at an appropriate point on conveyor 6, the program stored by the person 3 in the register device furnishes a pulse, and a device 15, which may be e.g. electromagnetic, pneumatic or hydraulic, raises the roll 16, which then pushes against the bell crank lever 17, 18 provided in connection with the conveyor 6, whereby this lever turns in its pivot and its arm 18 is pressed downwardly, causing in its turn the roll 13 on the end of lever arm 9 to meet it and the lever arm 9 to turn into the position indicated with dot-and-dash lines in FIG. 4, whereby the end of the piece of sawn timber is released from the pinch of the pincer-like device, and the piece of sawn timber will be carried off by the second part of the principal conveyor.

It is immaterial in itself, from the viewpoint of the invention, what kind of timber gripping devices are used on the oblique conveyor 6. For instance, if transportation of round timber is concerned, one may advantageously use spikes instead of the gripping bodies 11. The oblique conveyor may likewise differ even considerably from what has been presented above, as regards its design; the main point is, however, that the oblique conveyor moves the pieces of timber in their longitudinal direction so that always periodically the velocity component of the displacement of the timber piece in its longitudinal direction is non-existent, which moment is utilized in releasing the piece of timber from the grip of the oblique conveyor. The piece of timber has then no inertial movement whatsoever in its longitudinal direction, whereby the oblique conveyor may be operated at rather high speed. In the case illustrated by the drawing, the grabbing elements on the oblique conveyor drag the pieces of timber by one end and in their longitudinal direction. Of course, the conveyor solution according to the invention may be equally well realized by having the oblique conveyor 6 push the pieces of timber in their longitudinal direction. In that case, of course, the oblique conveyor has to be placed in another manner with reference to conveyor 1, that is, obliquely across the transport path of conveyor 1, whereby the pieces of timber transported by conveyor 1 will meet the oblique conveyor 6. In this embodiment it is not absolutely necessary for the oblique conveyor to be provided with actual grabbing elements; it suffices if the conveyor has shoulders of some kind, which meet the ends of the pieces of timber.

In the design embodiment presented, the pieces of timber which leave the oblique conveyor will be transported further onward so that their ends on one side, in FIG. 1 the lower ends, are aligned. At some handling stages of timber the need may also occur to transport pieces of timber, e.g. stocks or deals, so that the centerpoints of all pieces travel along the same line, in which instance then both ends of each piece of timber are equally distant from this selected line. The oblique conveyor implied by the present invention may also well be adapted to accomplish operations of this kind.

On the whole, too, the invention is in no way narrowly confined to the detailed design of the oblique conveyor and of the grabbing elements 7 used in its connection which has been shown in the drawing; various details of these structures may rather be altered and modified even considerably without leaving the domain of the invention. It is merely essential that on the transport path of the oblique conveyor there occur points at which the longitudinal velocity component of the piece of timber transported by this conveyor in its longitudinal direction, and thus its inertial moment in this direction, is non-existent or at least nearly non-existent.

I claim:

1. A timber conveyor, comprising a first conveyor which moves the timber forward in a transverse position, an oblique conveyor connected with the first conveyor and on which oblique conveyor the timber has both a velocity component in the transverse transporting direction and a velocity component parallel to the longitudinal direction of each piece of timber, endless conveying means on said oblique conveyor, elements located at a distance from each other on said endless conveying means, and said elements acting upon the ends of the pieces of timber and displacing them in their longitudinal direction, control means by which the end of the piece of timber can be set free from its connection with said elements into given, different positions in their longitudinal direction to be transported by the first conveyor alone, guiding means guiding the endless conveying means of the oblique conveyor in such manner that said elements travel along a periodically curved path so that at the moment when any piece of timber is set free the piece of timber has a velocity component in its longitudinal direction which is zero or nearly zero, wherein the oblique conveyor is located adjacent said first conveyor and said elements on the endless conveying means comprise grabbing means which engage the pieces of timber and pull them in their longitudinal direction.

2. A conveyor according to claim 1, wherein said grabbing means are pincer-like devices comprising jaws which press against the end of the timber.

* * * * *